United States Patent [19]

Oppliger

[11] Patent Number: 5,269,205

[45] Date of Patent: Dec. 14, 1993

[54] CIRCULAR SAW BLADE STRAIGHTENING MACHINE

[76] Inventor: Walter Oppliger, Industriestrasse 11, Postfach 6, CH - 3138 Uetendorf, Switzerland

[21] Appl. No.: 908,295

[22] Filed: Jul. 1, 1992

[30] Foreign Application Priority Data

Jul. 2, 1991 [CH] Switzerland ............. 1955/91

[51] Int. Cl.$^5$ ............................................. B23D 63/18
[52] U.S. Cl. ............................................. 76/27; 72/179
[58] Field of Search ................. 76/26, 27, 25.1; 72/176, 179, 226

[56] References Cited

U.S. PATENT DOCUMENTS

| | | | |
|---|---|---|---|
| 510,210 | 5/1893 | Toomer | 76/27 |
| 1,053,746 | 2/1913 | Roach | 76/27 |
| 1,096,756 | 5/1914 | Roach | 76/27 |
| 1,290,491 | 1/1919 | Blackwell | 76/27 |
| 3,964,348 | 6/1976 | Dawson | 76/26 |
| 4,852,430 | 8/1989 | Oppliger et al. | 76/27 |
| 4,875,393 | 10/1989 | Williams . | |

*Primary Examiner*—Parker, Roscoe V.
*Attorney, Agent, or Firm*—Ladas & Parry

[57] ABSTRACT

A circular saw blade straightening machine for eliminating unevenness in circular saw blades is disclosed, having straightening rollers disposed on both sides of the saw blade. The rollers are disposed opposite one another on a straight line passing through the middle of the saw blade. A feeler gauge is provided to scan the surface of the saw blade and to generate a signal in the event of unevenness being detected to initiate an appropriate movement of the straightening rollers.

9 Claims, 2 Drawing Sheets

CIRCULAR SAW BLADE STRAIGHTENING MACHINE

BACKGROUND OF THE INVENTION

The invention relates to a circular saw blade straightening machine, for eliminating unevenness in circular saw blades, having straightening rollers disposed on both sides of the saw blade for evening out uneven areas of the saw blade.

When circular saws are used in wood processing, unevenness develop in the saw blades which can be of such an extent after only a few hours' working time that the efficiency of the circular saw is severely impaired. Circular saw blades therefore have to be straightened at regular intervals, i.e. unevenness has to be eliminated. This has hitherto generally been done by hand on a straightening bench, unevenness being removed from the saw blade using a hammer on a planar steel plate. This was a very strenuous and laborious job and also led to relatively uneven results.

DESCRIPTION OF PRIOR ART

U.S. Pat. No. 510,210 discloses a device which serves to eliminate deformations on saw blades for circular saws. This machine has rollers or blocks on both sides of the saw blade which are disposed in relation to one another in such a way that the saw blade can be deformed in a direction opposite to that of the distortion.

U.S. Pat. No. 4,852,430 discloses a band saw blade straightening machine with sensor means for scanning the surface of the blade and for generating a signal in the event of unevenness in the saw blade and a straightening station with two pairs of straightening rollers as well as means for pressing the rollers against the saw blade. The straightening rollers comprise two pairs of rollers, one pair of which has a roller disposed above the band having a convex roller surface for smoothing upwards directed unevenness and a roller with a concave rolling surface disposed opposite it under the band, the other pair for smoothing downwards directed unevenness having a roller disposed above the band having a concave rolling surface and a roller with convex rolling surface disposed under the band. The two pairs of rollers are disposed immediately behind one another and behind the dial gauge so that a straight line of the saw blade is straightened on each passage.

This straightening machine is, however, unsuitable for circular saw blades because it is not possible to define straight pathways for the arrangement of straightening rollers and a sensor behind each other on a circular saw blade.

OBJECTS OF INVENTION

It is an object of the invention to provide a circular saw blade straightening machine which can be used to eliminate the above-mentioned unevenness down to deviations from the plane of three-hundredths of a millimeter. Fully automatic operation should, moreover, be possible, to dispense with the need for an operator.

BRIEF SUMMARY OF INVENTION

The instant invention accordingly provides a circular saw blade straightening machine having straightening rollers or drums for smoothing unevenness present on both sides of the saw blade and situated on a straight line passing through the middle of the saw blade and situated at distances substantially equal from the middle disposed opposite each other and a feeler gauge for scanning the surface of the saw blade and for generating a signal in the event of unevenness provided at the same distance from the middle of the saw blade offset at a particular angle to the straightening rollers.

According to a further embodiment of the invention, the rollers arranged both above and below the saw blade are mounted on radially moveable axles and may thus be either pressed against or lifted off the saw blade. In this way, saw blades having cut-away portions, slits or extensions, etc., can also be straightened.

According to a preferred embodiment the rollers disposed under the saw blade are disposed on fixed axles and the rollers disposed above the band are disposed on axles which are moveable so as to exert pressure.

According to another embodiment of the invention the means for pressing the rollers against the saw blade or lifting them off the saw blade consist of a pneumatic or hydraulic device and lever arms.

An electronic control unit is preferably provided which receives the signals from the dial gauge and the signals emitted by the drive unit concerning the band feed and processes these into an output signal which initiates the pressing or lifting off process.

According to a further preferred embodiment of the invention, an additional pair of rollers is provided, in addition to the straightening rollers, whereby both the upper as well as the lower rollers have a slightly convex curved surface lateral to the direction of travel of the saw blade. This additional pair of rollers serves to set up circles of stress which impart tension to the saw blade.

Various embodiments of the invention will now be described in a non-limiting manner with respect to the accompanying drawings.

BRIEF DESCRIPTION OF THE DRAWINGS

In the accompanying drawings there are shown in FIG. 1 a perspective overall representation of a preferred embodiment of the circular saw blade straightening machine of the invention in operation, in FIG. 2 an enlarged representation of the straightening rollers, in FIG. 3 a plan view of a saw blade in position in the machine, showing the arrangement of the rollers.

DETAILED DESCRIPTION PREFERRED EMBODIMENTS OF THE INVENTION

Figure 1:
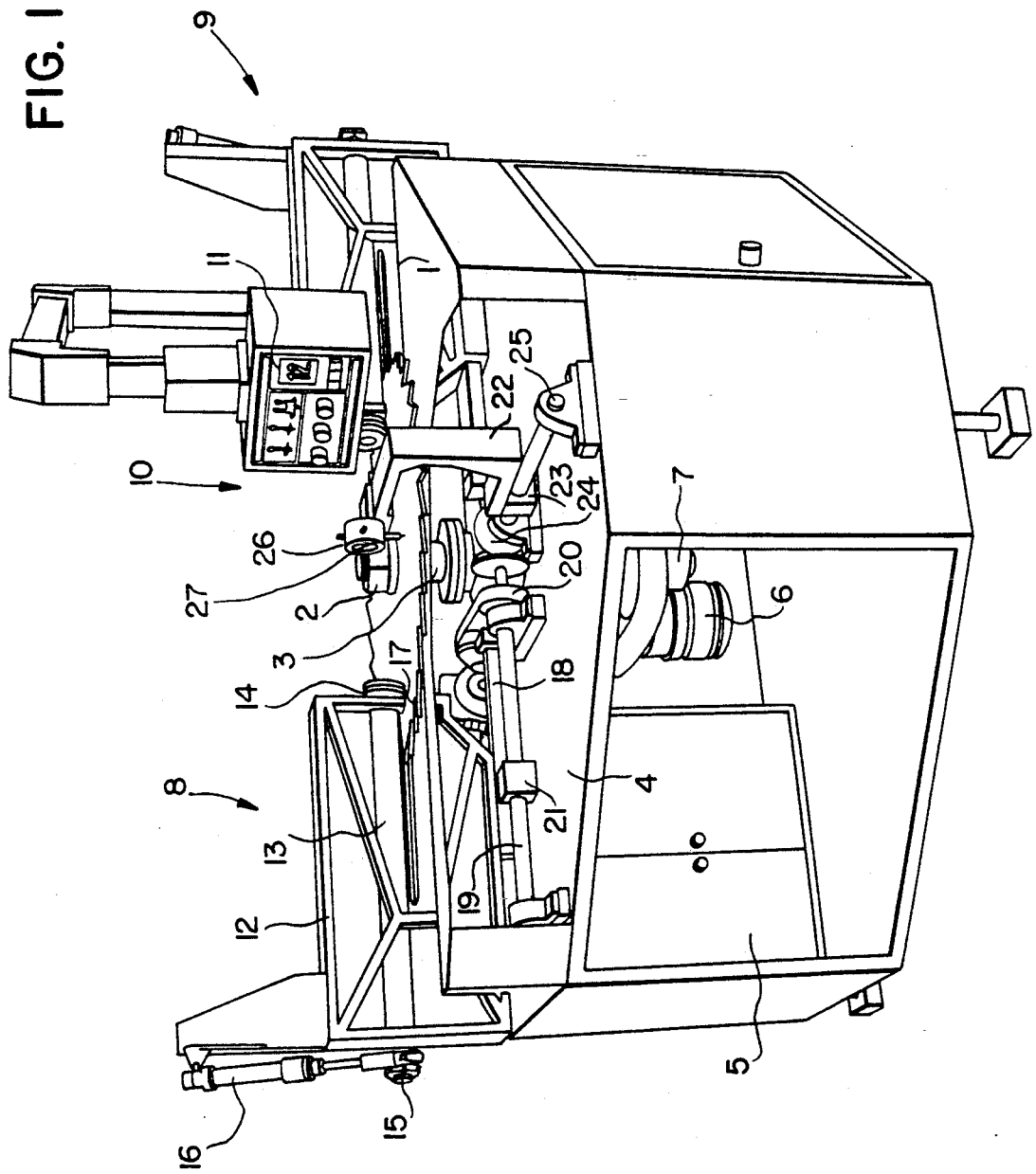

A circular blade 1 is mounted on a vertically disposed axle 3 using a securing nut 2. The axle 3 is fitted in the horizontal cover plate 4 of a housing 5 and driven by a drive motor 6 which is fitted in the housing under the cover plate. Also connected to the axle 3 is an incremental transmitter 7 which supplies electrical signals at specific angular positions of the axle.

Disposed on the cover plate 4 are a straightening station 8 for smoothing downwards facing unevenness in the saw blade 1, a second straightening station for smoothing upwards facing unevenness in the saw blade 1, a measuring station 10 and a control unit 11 which will be described in more detail below. The straightening stations are disposed exactly opposite one another in relation to the axle 3 or, in other words offset to one another by 180 degrees. The measuring station 10 is preferably located at the same angle from both straightening stations, i.e. it is offset thereto by 90 degrees.

The straightening station 8 has a frame 12 in which is lodged an axle 13 for a straightening roller or drum 14 disposed above the saw blade. The straightening drum 14 is eccentrically lodged on the axle 13 in such a way that it is normally at a small distance from the saw blade and that the drum is pressed against the saw blade when the axle turns. A pneumatic cylinder 16 associated via a lever 15 with the other end of the axle 13 and controlled by signals from the measuring station serves to rotate the axle 13.

A second roller or drum 17 which also rests against the saw blade is disposed under the saw blade in the frame 12. This serves as an abutment against which the saw blade is pressed when the upper drum 14 exerts pressure on the saw blade.

The frame 12 is slidably guided on a rail 18 firmly fixed to the housing and arranged radially to the saw blade. A threaded spindle 19 disposed parallel to the rail 18 which is rotated by a drive 20 and which meshes with an internally threaded block 21 associated with the frame causes the displacement of the frame with the straightening rollers radially to the saw blade.

The second straightening station 9 is similarly constructed. The measuring station also has a frame 22 radially slidable in relation to the saw blade, which is displaced in similar manner by means of a threaded spindle 25 guided by a threaded block 23 disposed on the frame 23 and turned by a drive assembly 24. A dial gauge 26 having a sensor pin 27 resting against the saw blade is located on the frame above the saw blade. The drives for the threaded spindles are adapted to one another in such a manner that the sensor pin 27 and the middle planes of the four straightening rollers are always located on the same circular line or circumference within the saw blade.

It can also be advantageous to provide a further adjustable supporting point for the saw blade whose level can be finely adjusted.

The electronic control 11 is disposed above the measuring station on a swivel arm on a vertical arm. This electronic control unit will not be described here in detail since the function which it has to fulfil can readily be executed by a person skilled in the art using an appropriate circuit.

An electrical lead connects the dial gauge 26 to the electronic control unit 11. This lead provides the control unit 11 with a signal when the sensor pin 27 of the dial gauge 26 is extended out beyond a given predetermined value. This value can be set in the control unit 11 and is three hundredths of a millimeter in the present embodiment.

Figure 2:
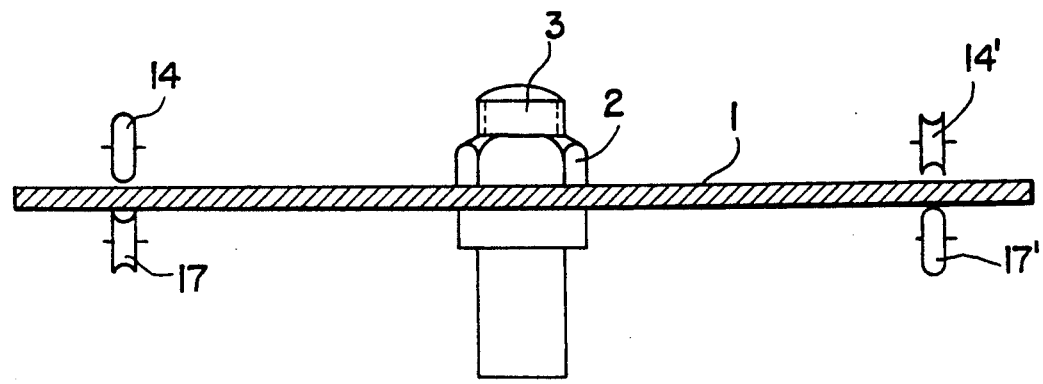

The shape and design of the rollers and their function may be seen in FIG. 2. It will be seen that the two lower rollers 17, 17' are in contact with the saw blade. The two upper rollers 14, 14' are at a small distance from the saw blade. As already mentioned, they are only pressed downwards when necessary. The roller 14 has a convex running or rolling surface. The roller 17 lying therebelow has a concave rolling surface. When the upper roller is pressed downwards the saw blade is pressed into the channel or groove of the lower roller by the curvature of the upper roller. In this case the greater the unevenness deviates from the planar state, the greater the resulting pressure. The situation is reversed on the right hand side of FIG. 2. The upper roller 14' has a concave roller surface, the lower roller 17' has a convex roller surface. If the upper roller 14' is pressed downwards, the saw blade 1 is pressed into the groove of the upper roller 20 by the curvature of the lower roller so as to even out any downwards directed unevenness.

Larger unevenness is already eliminated after one passage of one track. After several passages up to a maximum of five, the saw blade can once again be considered to be totally planar. After the selected number of passages for one track the straightening rollers and the dial gauge are displaced by the roller width of about 5 mm so that the next track can be treated.

It has been found advantageous to provide a certain amount of play in the case of the threaded spindles serving to advance the straightening device radially to the saw blade so that the tracks overlap when the process occurs in the opposite direction, i.e. when the straightening device and the dial gauge travel back again. This is particularly advantageous when wider rollers are used, for example 10 mm, in order to process larger saw blades more quickly.

Overlapping of the tracks can, however, also be adjusted in appropriate steps using stepping motors for the thread drive. The method of operation of the machine may clearly be seen from the appended drawings The saw blade is driven by the drive motor 6 so that it runs, for example, clockwise. The straightening stations 8 and 9 and the dial gauge 10 are positioned so that the sensor pin 27, the dial gauge 26 and the mid points of the rollers lie on the same circular path around the saw blade. At the beginning of the straightening process working begins with the smallest circle, i.e. close to the axle 3, because that is where the zero level of the saw blade is set. The straightening process for one track may take one passage or several passages of the saw blade. The number of passages per track is set from the control unit 12.

When the dial gauge encounters an unevenness beyond the preset limit value, the timespan corresponding to the distance from the dial gauge to the straightening rollers is determined with the aid of the incremental transmitter 7. After the expiry of this period of time, the control unit 11 gives a signal to the straightening unit which presses one of the two pneumatic cylinders against the saw blade at a preset pressure by rotating the corresponding shaft of one of the two upper rollers. If the unevenness was an upwards facing bump, the first roller is pressed downwards. If it was a depression, the second roller is pressed downwards.

The above-described embodiment of the invention is suitable for the treatment of circular saw blades which have a planar flat surface with no interruptions. Apart from such circular saw blades there are also others which have cut-away portions, such as for example slits, holes, etc., or elevated portions such as for example wider cutters. During the treatment of such circular saw blades, the feeler gauge would recognize such cut-away portions or elevated portions as unevenness which needed to be straightened out and would give appropriate signals to the straightening rollers. This would initiate an inappropriate straightening operation.

To avoid this, in a further embodiment of the invention an apparatus is provided for the detection of cut-away portions and means are provided for lifting the straightening rollers arranged on both sides of the circular saw blades. The measuring feeler gauge is also provided with two photoelectric cells which are arranged opposite each other adjacent the feeler. They are disposed in a radial plane with respect to the circular saw blade. Their distance from one another is for example 5 to 10 mm more than the width of the rollers.

The photoelectric cells each consist of a light source disposed above the circular saw blade and a detector located thereunder. If the circular saw blades being treated have cut-away portions which are detected by the photoelectric cells, the control unit gives an impulse to lift the rollers according to an appropriate angular distance.

In the case of cut-away portions in the circular saw blades and above all of the elevated portions mainly encountered at the edges of slits, such as wider cutters, both the upper and the lower rollers have to be lifted from the circular saw blades to prevent damage. For this purpose, in the embodiment for treating circular saw blades with cut-away portions and/or elevated portions the straightening rollers running underneath the blades are mounted on moveable axles just as the others are. These axles are moveable in a manner basically similar to that of the axles 13 so that the straightening rollers can be pressed against the circular saw blades or lifted away therefrom.

The dial gauge or other measuring feeler gauge 26 is also modified for circular saw blades with cut-away portions and/or elevated portions. Instead of the sensor pin 27 a ball for example 10 mm in diameter is provided which "falls" into a cut-away portion without becoming damaged and which can be lifted again at the following edge. The ball also rolls over elevated portions without difficulty. The downwards movement of the ball is advantageously restricted by a stop.

The impulse given by the control unit to lift the rollers is interrupted for the time taken for a cut-away portion to pass between the rollers. The straightening process continues normally thereafter.

Figure 3:
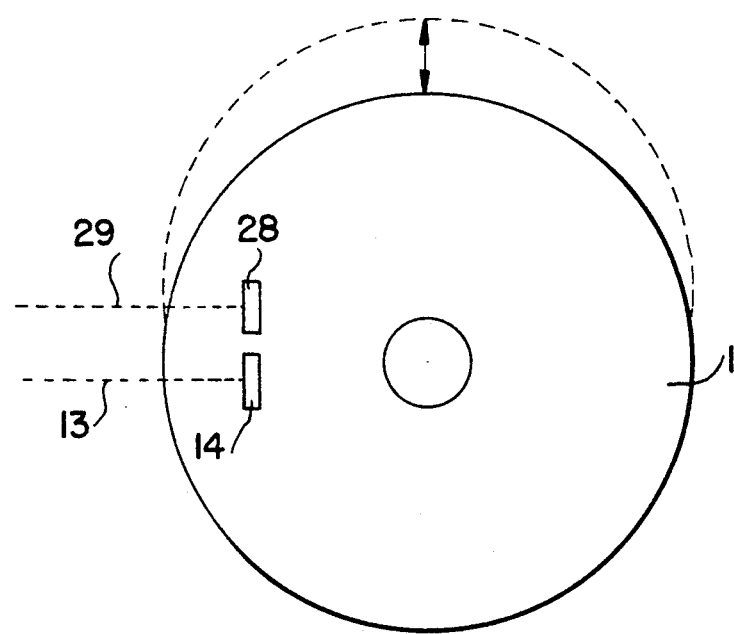

Another embodiment of the invention has additional means for rolling a desired tension into the circular saw blades. This procedure is known per se and has been conducted on equipment specially intended for this purpose As schematically shown in the plan view in FIG. 3, another roller 28 is disposed above the blade next to the straightening roller 14. This is mounted on a moveable axle 29 that lies parallel to the axle 13 and in principle similar thereto. Below the blade is an identically similar roller (not shown) which is also mounted on a correspondingly moveable axle. The roller 28 and its counterpart on the underside have a very weakly convex curvature transverse to the direction of travel.

In place of one pair of tensioning rollers 28 it is also possible to provide two pairs in each case next to the two pairs of straightening rollers.

These two tensioning rollers or tensioning roller pairs must, as in the case of the straightening rollers, be disposed in such a manner to the circular saw blade during operation that the axle 29 lies in a radial plan. To ensure this, means are provided with which the tensioned circular saw blade together with its drive can be shifted by the distance between the rollers 14 and 28, as indicated by the broken circular line. The means for shifting the blade are not shown since they can be manufactured without mechanical difficulties by a person skilled in the art. Using these additional rollers, the opposing pressure that they direct against the blade running therebetween flattens one or several circular tracks in such a manner that the blade is tensioned.

What is claimed is:

1. A circular saw blade straightening machine for reducing or eliminating unevenness in circular saw blades comprising:
   (a) two sets of straightening rollers adapted to be disposed on both sides of a saw blade, said straightening rollers being disposed opposite one another on a straight line passing through a centre point of the saw blade and
   (b) a feeler gauge being provided to scan one surface of the saw blade and to generate a signal in the event of unevenness at a certain angle to the straightening rollers at the same distance from the centre point of the saw blade.

2. A circular saw blade straightening machine according to claim 1 wherein the straightening rollers and the feeler gauge are displaceable by the same distance towards the middle or towards the circumference of a saw blade.

3. A circular saw blade straightening machine according to claim 1 wherein the rollers disposed on one side of the saw blade are mounted on fixed axles.

4. A circular saw blade straightening machine according to claim 1 wherein the rollers disposed on both sides of the saw blade are mounted on axles which are moveable for purposes of pressing.

5. A circular saw blade straightening machine according to claim 1 having hydraulic or pneumatic means and lever arms for pressing the rollers against a saw blade.

6. A circular saw blade straightening machine according to claim 1 having an electronic control unit for receiving signals from the feeler gauge and from a drive unit and means for processing the signals to an output signal which triggers the straightening process.

7. A circular saw blade straightening machine according to claim 1 having means for rolling tension-generating tracks in the blade.

8. A circular saw blade straightening machine according to claim 1 wherein said means comprise at least one additional pair of rollers with two similar slightly convexly curved rollers transverse to the running surface on both sides of the blade and means for pressing the rollers against the blade.

9. A circular saw blade straightening machine according to claim 1 having means for detecting apertures in a treated saw blade.

* * * * *